June 18, 1935. C. F. PILCHER 2,005,389
MOTOR VEHICLE TRANSMISSION CONTROL
Filed Aug. 2, 1932 3 Sheets-Sheet 1
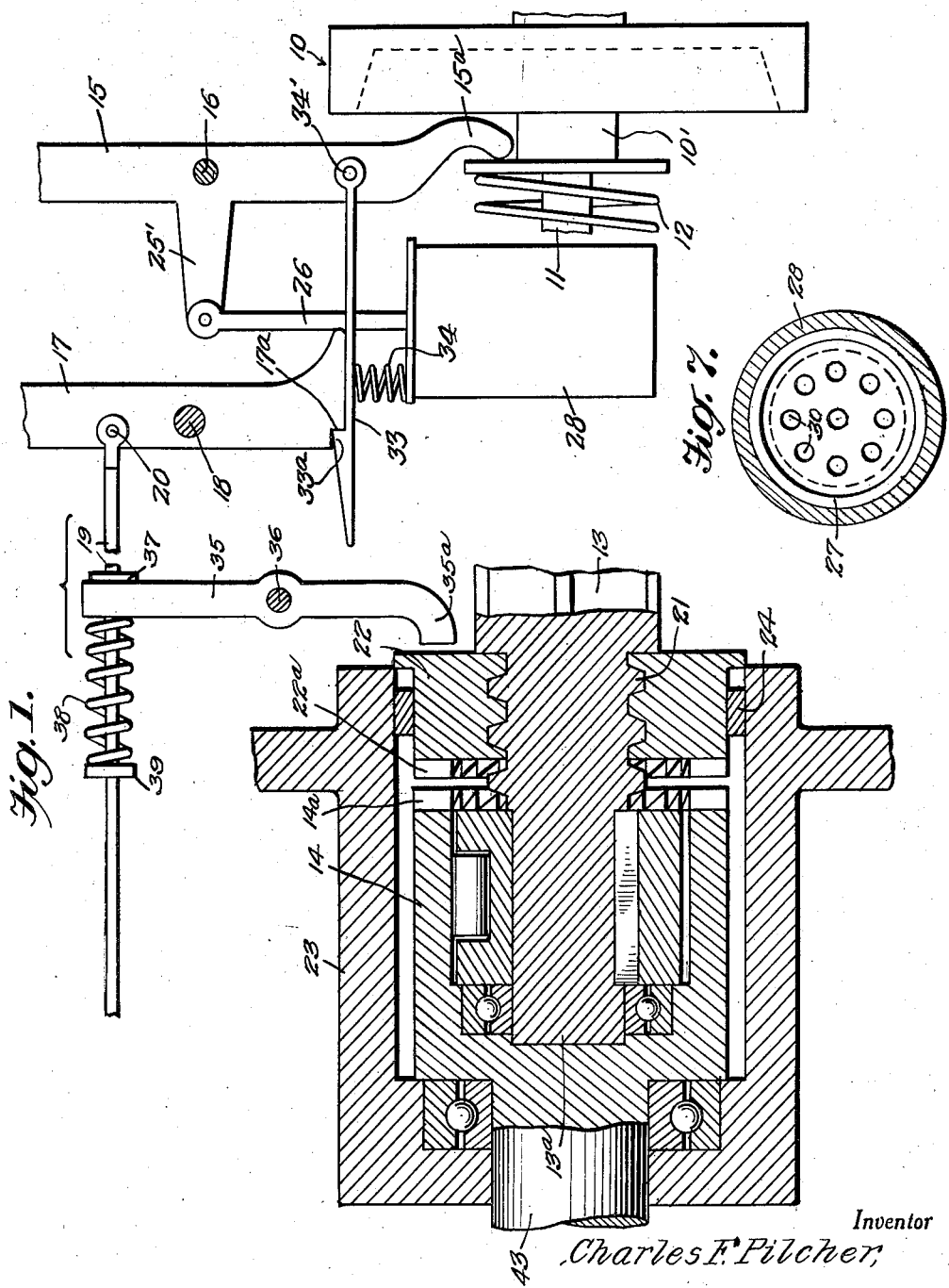
Inventor
*Charles F. Pilcher*
By *Clarence A. O'Brien*
Attorney

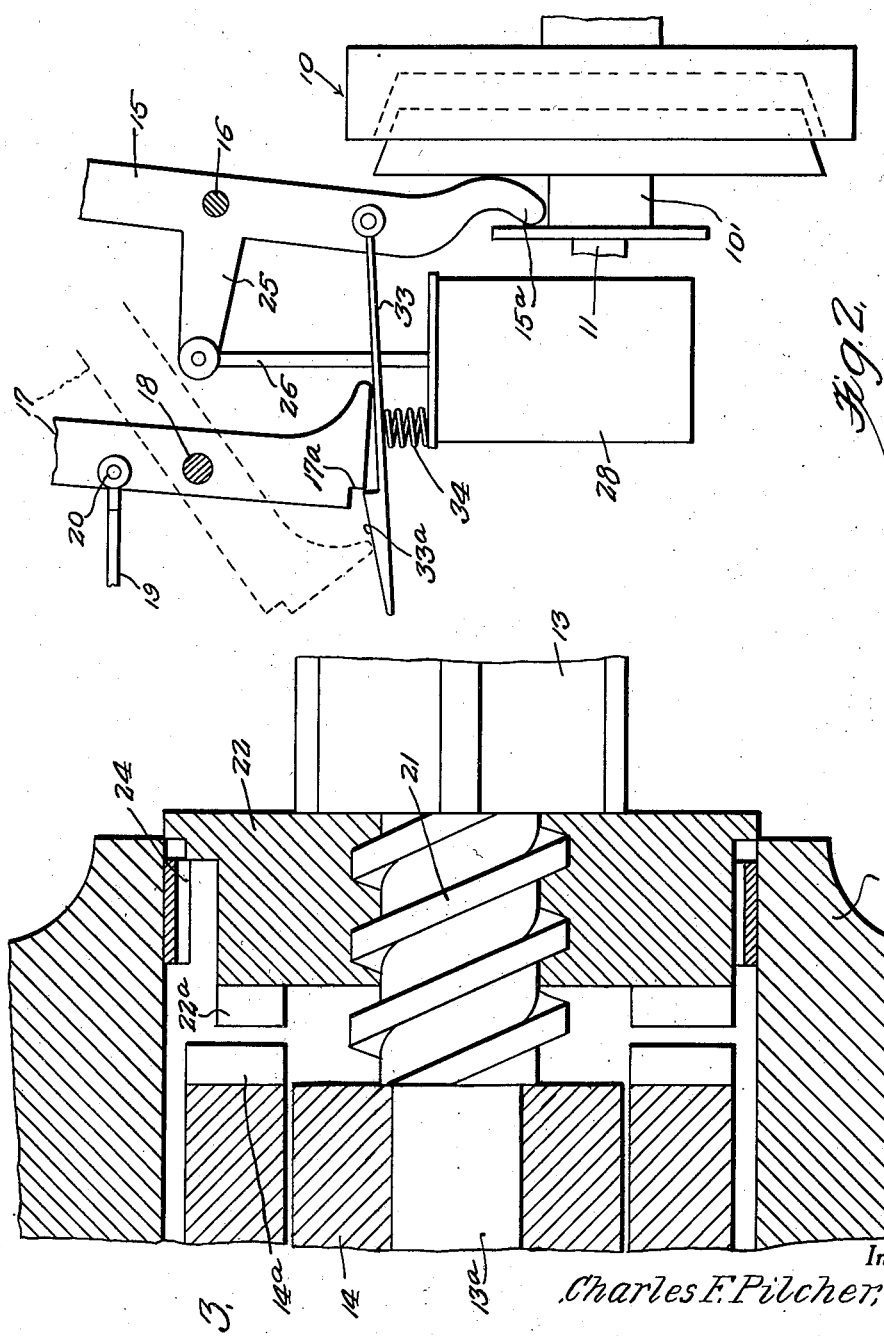

June 18, 1935.  C. F. PILCHER  2,005,389
MOTOR VEHICLE TRANSMISSION CONTROL
Filed Aug. 2, 1932   3 Sheets-Sheet 3
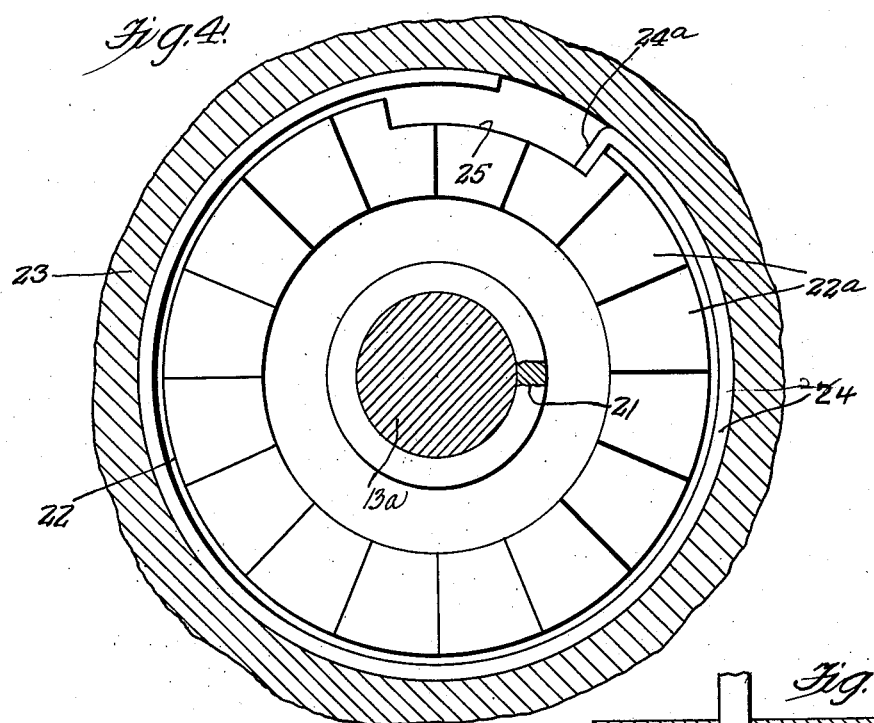
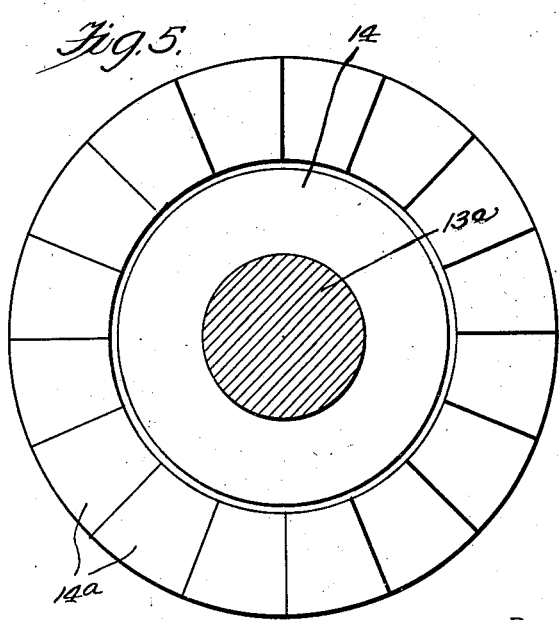
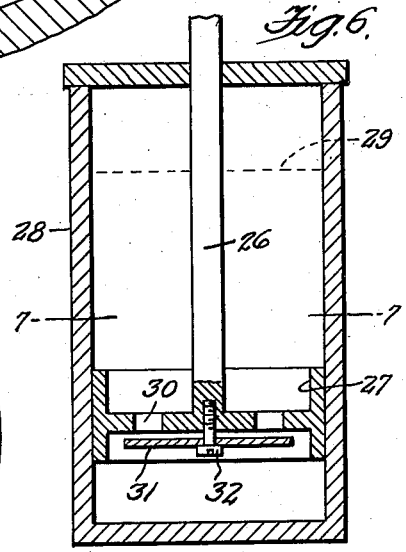
Inventor
Charles F. Pilcher,
By Clarence A. O'Brien
Attorney Patented June 18, 1935

2,005,389

UNITED STATES PATENT OFFICE 2,005,389

MOTOR VEHICLE TRANSMISSION CONTROL

Charles F. Pilcher, St. Louis, Mo.

Application August 2, 1932, Serial No. 627,268

3 Claims. (Cl. 192—48)

This invention relates to a mechanism which may be termed a "motor vehicle transmission control", the same being especially designed for application to motor driven vehicles, and especially to motor vehicles of the type embodying what is known in the art as a free wheeling device.

The object of the invention is to provide a control mechanism of the character above mentioned whereby, when desired, and when the vehicle is in "free wheeling" a braking action may be applied to the vehicle through the motor instead of through the medium of the vehicular wheel brakes; and further whereby a reverse or forward drive may be provided without interfering with or preventing operation of the overrunning clutch or free wheeling device.

The invention together with its numerous objects and advantages will be best understood from a study of the following description taken in connection with the accompanying drawings wherein:

Figure 1 is a diagrammatic illustration of a preferred form of the invention and showing the application of the invention.

Figure 2 is an elevational view showing the two positions of the brake pedal in the operation of the invention one position being shown in full lines, and the other position being suggested by dotted lines.

Figure 3 is a fragmentary vertical sectional elevational view showing a clutch and free wheeling mechanism forming part of the invention.

Figure 4 is a sectional elevational view through the shiftable clutch member from the toothed side thereof.

Figure 5 is a sectional elevational view showing the toothed face of the free wheel or overrunning clutch unit.

Figure 6 is a sectional view of a dash pot forming part of the invention, and

Figure 7 is a transverse sectional view taken substantially on the line 7—7 of Figure 6.

Referring to the drawings by reference numerals it will be seen that numeral 10 designates generally the main clutch of the motor vehicle, which includes the shiftable clutch element 10' arranged on the usual drive shaft, a portion of which shaft is shown in the drawings and indicated by the reference numeral 11. The clutch 10 is normally engaged for providing a drive between the drive shaft 11 and the crank shaft of the motor through the medium of a spring 12. The main transmission shaft which is suitably connected with the shaft 11 is also shown fragmentarily in the drawings and is designated by the reference numeral 13. The clutch pedal is designated by the reference character 15 and is pivoted as at 16. The reference numeral 17 designates generally the brake pedal which latter is pivoted as at 18. The brake control rod, also shown fragmentarily, is designated by the reference character 19. As shown the rod 19 is connected with the pedal 17 as at 20. The transmission casing is designated by the reference numeral 23. The reference numeral 43 designates a portion of the driven or propeller shaft of the vehicle. The elements above set out are more or less conventional and further detailed description thereof is deemed unnecessary.

In accordance with the present invention, there is provided on the reduced portion 13a of the transmission shaft 13 spiral threads 21. An axially shiftable clutch member 22 includes a substantially circular or disk like body portion having an axial spirally threaded bore for accommodating the threads 21 as shown in Figure 3. On one face thereof the body of the clutch member 22 is provided with a circular series of ratchet clutch teeth 22a adapted to cooperate with similar teeth 14a provided on the driven element of the conventional free-wheeling or overrunning clutch device shown clearly in Figure 1.

Disposed about the clutch member 22 is a split ring 24 that is adapted to frictionally engage the walls of the transmission housing 23; and at one end thereof the ring 24 is provided with a hook 24a engaging a groove 25 provided in the periphery of the clutch member 22. Obviously, with the ring 24 in expanded condition, and hook 24a thereof engaged with one end of groove 25, the clutch member 22 will be held against rotative movement in one direction and will have only a limited rotative movement in a relatively opposite direction as will be apparent from a study of Figure 4. In this connection it is submitted, that the limiting of this rotative movement of the clutch member 22 before restraining action takes effect is to compensate for the tendency of said member to rock backwardly or in an anticlockwise direction as will be occasioned when the device, in a manner hereinafter made manifest, is operated for providing a drive between the shafts 13 and 43 for applying a braking action to the rear drive wheels of the vehicle, and thereby reduce strain and shock to the rotating parts when the device is operated for the purpose just stated.

As shown in Figure 1, clutch pedal 15 has an end 15a thereof engaged with the shiftable clutch element 10' of the main clutch 10, and adjacent its pivot 16 the pedal 15 is also provided with an arm 25' with which is pivotally connected one end of a piston rod 26. Piston rod 26 is connected with a piston 27 forming part of a dash pot, which latter also includes a suitably supported cylinder 28 in which the piston 27 is mounted for reciprocation, and which is also adapted to contain a suitable liquid 29 as shown in Figure 6. The body of the piston 27 is provided with port openings 30 controlled by a disk valve 31 loosely connected with the piston 27 by a bolt or other suitable fastening element 32 as also shown in said Figure 6.

A latch member 33 is pivoted at one end as at 34' to the clutch pedal 15, and at its free end is provided with a head 33a engageable with a shoulder 17a provided on the lower end of the brake pedal 17. The latch member 33 is normally urged upwardly to engage head 33a thereof with the shoulder 17a through the medium of a coil spring 34 as shown in Figure 1.

Thus it will be seen that when the brake pedal 17 is depressed in a manner to rock in a clockwise direction, either to apply the brakes in the usual manner, or to operate the invention in a manner hereinafter to be made manifest, the pedal 15 will also be caused to rock in a corresponding direction for moving the clutch member 10' against the action of spring 12 and thereby momentarily releasing the drive connection between the crank shaft of the motor and the shaft 11, for the purpose, as is thought apparent to reduce shock to the driving parts as might be occasioned by the sudden application of the brakes.

A clutch shifting lever 35 is pivoted as at 36 and has one end arranged to engage one end of the clutch member 22 and its other end slidably engaged with the rod 19. The last named end of the lever 35 is yieldably engaged with a fixed collar 37 provided on the rod 19 through the medium of a spring 38 disposed about the rod 19 and interposed between said end of the lever 35 and a second collar 39 provided on the rod 19.

The operation of the device should be clear from the following:

When the parts are in the position shown in Figure 1 the vehicle is in free wheeling. In this connection it will be noted that the clutch elements 22 and 14 are disengaged, and of course the speed of the vehicle, that is to say the rear wheel drive speed of the vehicle will be in excess of the speed at which the motor is turning.

With the parts in the position shown in Figure 1 let it now be assumed that it is desirous of applying a braking action to the vehicle from the motor, thus using the motor as a brake which is very desirable when the vehicle is travelling down an incline such as a mountain grade. To this end, the operator presses on the brake pedal 17 to cause the same to rotate in a clockwise direction momentarily releasing the clutch 10 in a manner hereinbefore set out. This depressing of the brake pedal will of course cause the brake rod 19 to move toward the right in Figure 1 for applying the vehicular wheel brakes in the usual manner, and at the same time to cause the lever 35 to rotate in a clockwise direction upon its pivot 36. Rotative movement of the lever 35 will cause the end 35a thereof to engage the clutch member 22 to forcibly move the same toward the clutch member 14 against the action of the restraining band 24 associated with the clutch member 22 and cause the clutch teeth 22a to engage the clutch teeth 14a thereby providing a positive drive connection between the clutch members 22 and 14, and this drive connection, by reason of the spiral threaded engagement of the clutch member 22 with the shaft 13 provides a forward positive drive between the shafts 43 and 13 compelling the vehicle, that is to say, the rear wheel drive of the vehicle to drive the motor and thus set up the desired braking effect from the motor so long as the motor is allowed to idle and the speed of the shaft 13 does not exceed the speed of the shaft 43. With the parts thus engaged it will be seen that a braking action is set up, using the motor as a brake and obviating the necessity of maintaining the vehicular wheel brake in brake applying position.

Now when it is desired to provide a forward drive from the motor to the vehicle, or in other words to the rear wheel drive of the vehicle for driving the vehicle from the motor the operator presses on the accelerator in order to increase the speed of the motor over the speed of the vehicle, that is to say over the speed of the rear wheel drive of the vehicle. Obviously, as soon as the speed of the motor increases over the speed of the vehicle, shaft 13 will exceed in speed, the speed of shaft 43 with the result, through means of the spiral threaded connection between clutch member 22 and the end 13a of shaft 13, clutch member 22 will move in a direction away from clutch member 14.

The clutch member 22 will be retained in the position shown in Figure 1 upon movement in the direction just mentioned, through the medium of the retaining band 24, clutch member 22 and clutch member 14, as is thought apparent, being disengaged during all forward speeds, and as long as shafts 13 and 43 rotate at the same speed the overrunning clutch 14 will maintain a positive forward drive connection between said shafts.

Now when it is desired to reverse the vehicle the transmission is of course first placed in reverse speed manually by proper manipulation of the gear shift lever to cause the motor to drive shaft 13 in a direction opposite to the direction of rotation of said shaft 13 when the vehicle is in one of the forward speeds. Upon reverse rotation of the shaft 13 the clutch member 22, by reason of the restraining action thereon through the band 24, and the spirally threaded engagement thereof with the shaft end 13a, will be caused to rotate at a slightly less speed than the speed of rotation of shaft 13 so that the clutch member 22 is automatically caused to shift toward the left in Figure 1 to engage teeth 22a thereof with teeth 14a of the clutch member 14 to provide a positive reverse drive connection between the shafts 13 and 43 for reversing the vehicle.

In the claims:

1. In a vehicular transmission control, the combination with a brake control rod, alined driving and driven shafts, and an overrunning clutch device connected with said shafts to provide a forward drive connection between said shafts when the shafts are turning at the same speed, and to release said drive connection when the speed of the driven shaft exceeds the speed of the driving shaft, and including a driven clutch element; of a clutch member having threaded engagement with the driving shaft and cooperable with the driven clutch element to provide, independently of said overrunning clutch, a positive drive from the driven to the driving shaft for braking purposes, an operating connection between the brake rod and the clutch member associated with the driving shaft for moving the last named clutch member into engagement with the driven clutch element upon movement of the brake control rod incident to an application of the vehicular wheel brakes to provide the last named drive connection between said shafts upon rotation of the driving shaft in one direction, and yieldable means to impede rotation of the second clutch member with the driving shaft to cause said clutch member to move axially of the driving shaft upon rotation of the driving shaft in either direction, toward or away from the clutch element of the overrunning clutch device, and in accordance with the difference in speed of rotation between the driving and driven shafts.

2. In a vehicle transmission control, the combination with a driving and a driven member, an overrunning clutch connected with said members, adapted to be automatically engaged or disengaged by a difference in speed between said members, and including a clutch part carried by the driven member, a brake control rod, a brake pedal connected therewith, and a clutch pedal; of an additional clutch member having a screw threaded engagement with the driving member and adapted to be automatically engaged or disengaged with the first mentioned clutch part by a difference in speed of rotation between the driving and driven members; an operating connection between the brake rod and additional clutch part to forcibly engage the latter with the first mentioned clutch part when the overrunning clutch is disengaged and as incidental to a depressing of the brake pedal, and an operating connection between the brake and clutch pedals for depressing the latter pedal to momentarily interrupt transmission of power from the engine to the driving member incidental to the depressing of the brake pedal.

3. In a vehicular transmission, a mechanism for transmitting power from an internal combustion engine to the driving wheels of the vehicle and comprising an overrunning clutch, a shiftable cooperating clutch member for engagement with the overrunning clutch for either driving the engine from the driving wheels for braking purposes or for driving the vehicle backward according to the direction of rotation of the shiftable clutch member, a stationary housing surrounding the shiftable clutch member, a friction ring disposed circumferentially of the shiftable clutch member and cooperable with said clutch member and wall of the housing to impede rotative movement of said clutch member, said ring being shiftable with said clutch member, a brake control rod, and an operating connection between said rod and clutch member for forcibly shifting the clutch member into engagement with the overrunning clutch incidental to a movement of the brake control rod in a brake applying direction.

CHARLES F. PILCHER.